UNITED STATES PATENT OFFICE.

HANS A. FRASCH, OF CLEVELAND, OHIO, ASSIGNOR TO THE GRASSELLI CHEMICAL COMPANY, OF SAME PLACE.

PETROLEUM SULFO-ACID.

SPECIFICATION forming part of Letters Patent No. 518,990, dated May 1, 1894.

Application filed April 19, 1893. Serial No. 471,017. (Specimens.)

*To all whom it may concern:*

Be it known that I, HANS A. FRASCH, a citizen of the United States, residing at Cleveland, in the county of Cuyahoga and State of Ohio, have invented certain new and useful Improvements in Sulfo-Acid and the Process of Producing the Same; and I do hereby declare that the following is a full, clear, and exact description of the invention, which will enable others skilled in the art to which it appertains to make and use the same.

This invention relates to the utilization of such hydrocarbons as natural mineral oils or petroleum for obtaining a body or product which may be employed for obtaining dye-stuffs or color bases.

In practicing my invention, I treat crude oil or its derivatives or distillates with sulfuric acid until sulfonation is effected, and then separate the product into what by analogy may be termed alpha and beta acids, from which colors or dyestuffs may be obtained.

The present invention consists in the method of obtaining the beta acid, and also consists in the acid product.

In carrying out my invention, I subject crude petroleum or its distillates or products, residual or otherwise, to the action of sulfuric acid until all the aromatic hydrocarbons, olefines, naphthenes and unsaturated hydrocarbons in the oil are taken up in the acid as oxidized and corresponding sulfo products. The proportion of acid to oil varies greatly according to the quality of the oil being treated. Crude oil requires about twenty-five per cent. while distillates require from two to ten per cent. and sludge from nothing to five per cent. according to the quantity of acid remaining in the substance.

In all cases, the treatment proceeds alike, substantially as follows: The mixture of acid and oil is agitated, mechanically or by a forced current of air until a sample from which the acid has been permitted to settle will discolor little if any upon the addition thereto of fresh concentrated sulfuric acid. The mixture of acid and oil is then permitted to rest until the acid is separated from the oil, when the acid containing the aromatic hydrocarbons and tarry substances is drawn from the oil. The remaining oil may be washed and further utilized for petroleum products as is ordinary crude oil. The acid mixture taken from the oil is then heated until the hydrocarbons contained therein are converted into sulfo combinations and oxidized products, and this treatment is of the essence of my invention.

Sulfonation may be effected without heat by keeping the mixture agitated for a long time, say, from four to eight weeks, and even longer, thus permitting the acid to act upon the hydrocarbons. Fuming or so-called Nordhausen sulfuric acid or a mixture of chromic and sulfuric acids may also be employed for sulfonation. The requisite degree or extent of sulfonation is determined when the bulk of a test sample will dissolve in a hot solution of alkali. The free sulfuric acid is then removed, and this may be readily accomplished by neutralization or repeatedly washing the mixture with cold water, or by precipitating the sulfo compound from the acid. After the free acid is removed, the residuum is heated with water until the water is saturated with the more soluble sulfo products. The solution is left to settle, whereby the soluble products and the insoluble matter and oily matter are separated. The soluble products are then drawn off and consist of a mixture of different higher or lower sulfo products. To separate these products carbonate of lime or caustic lime is added with or without heating until precipitation ceases, whereby a soluble and an insoluble calcium salt are obtained. Any other substance which will form a soluble and an insoluble salt with the sulfo product may be substituted for the calcium. The insoluble salt is then separated from the solution by decantation, filtration or other means, and is converted into a soluble salt by the addition thereto of carbonate of sodium or caustic soda, or other substance that will serve to precipitate the base used in obtaining the soluble and insoluble products above described and form a soluble combination with the acid. This solution contains what by analogy may be termed the beta sulfo acid salt. From the solution the beta acid may be separated by the addition of hydrochloric acid or any other acid which will displace it from the solution. The precipitated acid is separated by filtration or decantation. A main chemical characteristic of the acid is that its calcium salt is insoluble in water. The acid when fresh made is of a black resinous appearance, without apparently well defined crystalline structure, quite frangible, soluble in water and glycerin, partly soluble in alcohol, benzene and many of the aromatic hydrocarbons; in many if not all of its solutions it has a greenish or bluish fluorescence, is of a brownish color in solution and emits the distinctive odor of coal oil when subjected to high heat and melts at about 200° Fahrenheit. It forms soluble salts of a brown color with soluble alkalies. Muriatic acid has no effect upon this substance, and chloride of lime or other oxidizing agent changes it to a brown color. The acid also may be separated from its calcium salt by exposing the latter to the action of hydrochloric acid, or any other acid which has a greater affinity for calcium than the sulfo acid itself. The acid when reacted upon by nitrous or nitric acid in weak solution forms azo and nitro bodies, and assumes a reddish brown color.

One purpose for which the acid herein described is specially serviceable is the production of dyestuffs.

What I claim is—

1. The process of manufacturing from mineral oil, or petroleum or derivatives or distillates thereof, an acid whose calcium salt is insoluble in water, which consists in sulfonating the substance under treatment, removing the free sulfuric acid, separating the soluble and the insoluble and oily matters from the remainder, converting the soluble matter into a soluble and an insoluble salt by, for example, the addition of carbonate of lime separating the insoluble salt, and rendering it soluble by the addition thereto of a suitable reagent, such as carbonate of sodium, caustic soda or other substance that will displace the base contained in the insoluble salt and precipitating from such solution the sulfo acid by means of hydrochloric or equivalent acid, substantially as described.

2. The process of manufacturing from mineral oil or petroleum or derivatives or distillates thereof, an acid whose calcium salt is insoluble in water, which consists in sulfonating the substance under treatment, removing the free sulfuric acid, separating the soluble and the insoluble and oily matters from the remainder, converting the soluble matter into a soluble and an insoluble salt by, for example, the addition of carbonate of lime separating the insoluble salt, and finally treating it with hydrochloric acid, substantially as described.

3. As an article of manufacture, a sulfo acid, derived from petroleum, of greenish black color, soluble in water, fluorescent in solution, not reacted upon by muriatic acid, changed to a brown color by chlorid of lime or other oxidizing agent, capable of dyeing wool or silk a brownish color without mordant, emitting when heated to red heat the characteristic odor of burning petroleum and whose calcium salt is insoluble in water, substantially as described.

Witness my hand to the foregoing specification.

HANS A. FRASCH.

Witnesses:
H. T. FISHER,
GEORGIA SCHAEFFER.